(12) United States Patent
Gupta

(10) Patent No.: US 8,340,710 B2
(45) Date of Patent: Dec. 25, 2012

(54) DOMAIN ID MAPPING FOR WIRELESS DEVICE IDENTIFIERS

(75) Inventor: Kirti Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1713 days.

(21) Appl. No.: 11/066,956

(22) Filed: Feb. 25, 2005

(65) Prior Publication Data

US 2005/0197101 A1 Sep. 8, 2005

Related U.S. Application Data

(60) Provisional application No. 60/548,684, filed on Feb. 26, 2004, provisional application No. 60/549,218, filed on Mar. 1, 2004.

(51) Int. Cl.
*H04M 1/00* (2006.01)
(52) U.S. Cl. .................. 455/551; 455/554.2; 455/556.1; 455/557; 455/433; 455/445; 455/414.1; 455/410; 370/338; 379/221.08
(58) Field of Classification Search .................. 455/551, 455/554.2, 556.1, 557, 445, 414.1, 410, 433
See application file for complete search history.

(56) References Cited

U.S. PATENT DOCUMENTS

| | | | |
|---|---|---|---|
| 5,903,845 A | 5/1999 | Buhrmann et al. | |
| 6,236,652 B1 * | 5/2001 | Preston et al. | 370/349 |
| 6,571,094 B1 * | 5/2003 | Begeja et al. | 455/417 |
| 6,965,666 B1 * | 11/2005 | Zhang | 379/88.17 |
| 7,062,279 B2 * | 6/2006 | Cedervall et al. | 455/456.3 |
| 7,636,750 B2 | 12/2009 | Haldar | |
| 2002/0083141 A1 | 6/2002 | Goto | |
| 2003/0182374 A1 | 9/2003 | Haldar | |
| 2004/0266453 A1 * | 12/2004 | Maanoja et al. | 455/456.1 |
| 2006/0111130 A1 * | 5/2006 | Lee et al. | 455/466 |

FOREIGN PATENT DOCUMENTS

| | | | |
|---|---|---|---|
| JP | 200226987 | | 1/2002 |
| JP | 200346666 | | 2/2003 |
| JP | 2003046666 A | * | 2/2003 |
| JP | 2003283575 | | 10/2003 |
| WO | WO03053083 A2 | | 6/2003 |

OTHER PUBLICATIONS

International Search Report and Written Opinion—PCT/US2005/006634, International Searching Authority—US, Mar. 19, 2007.
Taiwan Search Report—TW094105888—TIPO—Oct. 27, 2011.

* cited by examiner

*Primary Examiner* — Marceau Milord
(74) *Attorney, Agent, or Firm* — Raphael Freiwirth

(57) ABSTRACT

A wireless telecommunication device and method of generating a domain ID from the wireless telecommunications network identifier of other communicating devices, such as a telephone number or mobile identification number (MIN), and creating a SIP URL to direct communications across a TCP/IP capable network. The wireless telecommunication device can generate more than one domain ID for same network identifier, and can include geographic information in the domain name to provide additional information about the other communicating device within the SIP URL address.

18 Claims, 5 Drawing Sheets

| MIN/MDN Portion | Domain ID |
|---|---|
| 858, 619 | regionSD.carrier.com |
| 732, 848 | regionNJ.carrier.com |
| ⋮ | ⋮ |
| N identifiers | N domains |

92↗

DOMAIN ID MAPPING FOR WIRELESS DEVICE IDENTIFIERS

CROSS-REFERENCE TO RELATED APPLICATION

This application claims benefit of U.S. Provisional Application Ser. No. 60/548,684, filed Feb. 26, 2004 and U.S. Provisional Application Ser. No. 60/549,218 filed Mar. 1, 2004, the entirety of which is hereby incorporated herein by this reference.

BACKGROUND OF THE INVENTION

1. Field of the Invention

The present invention generally relates to wireless telecommunications. More particularly, the present invention relates to a system and method for mapping domain identifiers, common in TCP/IP protocol, to wireless telecommunication device identifiers, such as mobile identification numbers (MIN) and phone numbers.

2. Description of the Related Art

The first cellular networks were introduced in the early 1980s using analog radio transmission technologies such as AMPS (Advanced Mobile Phone System). Within a few years, cellular systems began to hit a capacity ceiling as millions of new subscribers signed up for service requiring increased airtime. Dropped calls and network busy signals became common in many areas. To accommodate more traffic within a limited amount of radio spectrum, the industry developed a new set of digital wireless technologies called TDMA (Time Division Multiple Access), GSM (Global System for Mobile), and CDMA (Code Division Multiple Access). TDMA and GSM use a time-sharing protocol to provide three to four times more capacity than analog systems. CDMA, however, is based upon a multiple access technique using orthogonal codes to keep information channels separate from each other.

A modern standard of CDMA technology, CDMA2000, supports both voice and data services over a standard CDMA communication channel. In such system, wireless telecommunication carrier networks offer data services to CDMA subscribers as an overlay Internet Protocol (IP) based application network over the CDMA infrastructure. Session Initiation Protocol (SIP) is an application-layer control (signaling) protocol for creating, modifying and terminating sessions with one or more participants. In services offered under CDMA 2000, the system uses a SIP universal resource locator (URL) based user addresses in the form of: <username>@<domain>. Based on the SIP URL addressing scheme, a default domain name or ID as defined in an existing mapping table can be appended to the ENUM (RFC 3761), phone number, mobile identification number (MIN), mobile directory number (MDN), or other wireless device identifier. However, a service carrier may wish to partition its network based on different domains assigned to its subscribers and the present standard does not allow such partitioning.

Accordingly, it would be advantageous to provide a system and method that allows wireless telecommunication carriers to partition their network and deploy multiple domain IDs for their subscribers. Such service should allow the carrier's subscribers to type in a phone-number (i.e., the MIN/MDN) in order to contact another wireless device and use the same wireless data service of the carrier. Such system and method should be able to implemented on an existing wireless telecommunication infrastructure. It is thus to the provision of such a system and method of domain ID mapping of wireless telecommunication device identifiers that the present invention is primarily directed.

SUMMARY OF THE INVENTION

Briefly described, the invention is a wireless telecommunication device that can generate a domain ID, such as a SIP URL, from the Wireless telecommunications network identifier, such as a telephone number or mobile identification number (MIN), to direct communications across a TCP/IP network. The wireless telecommunication device can generate more than one domain ID for incoming network identifiers, and can include information regarding the home region, or area of subscription in the domain name to provide additional information about the device for which it has created a SIP URL address. Through use of the system, the wireless telecommunications systems carrier can partition its application network using SIL URL addressing by assigning different domains to users based upon subscription criteria as identified in the MIN/MDN number already, e.g. the area code of the phone number. The solution is also flexible as the definition of the application network region does not need to be rigidly tied to the wireless telecommunication network region or geographical regions identified by the MIN/MDN of the wireless device subscriber.

In one embodiment, there is provided a wireless telecommunication device including a computer platform having at least a memory and a communication interface, the device further selectively interfacing and sending and receiving data across a wireless telecommunication network through the communication interface. The device further receives a specific first wireless device identifier, such as a MIN or phone number, in a first network protocol to identify the device on the wireless telecommunication network. The device further includes a converter in the memory to generate a second wireless device identifier for the device in a second network protocol, such as a SIP URL or domain ID, and the converter is capable of making a plurality of second wireless device identifiers based upon the first wireless device identifier.

The system accordingly provides a method of generating a second network identifier, such as a SIP URL, of a second network protocol at a wireless telecommunication device having a first network identifier, such as a MIN, in a first network protocol. The method includes the steps of selectively interfacing a wireless telecommunication network from the wireless telecommunication device, and generating a second network identifier at the wireless telecommunication device in a second network protocol, with the wireless telecommunication device being capable of generating a plurality of second network identifiers based upon the first network identifier. Thus, the wireless device can assign a variety of domain IDs to any incoming first network identifier as needed, as opposed to only appending one default domain name to a known MIN.

Other objects, advantages, and features of the present invention will become apparent after review of the herein after set forth Brief Description of the Drawings, Detailed Description of the Invention, and the Claims.

DETAILED DESCRIPTION OF THE INVENTION

Figure 1:
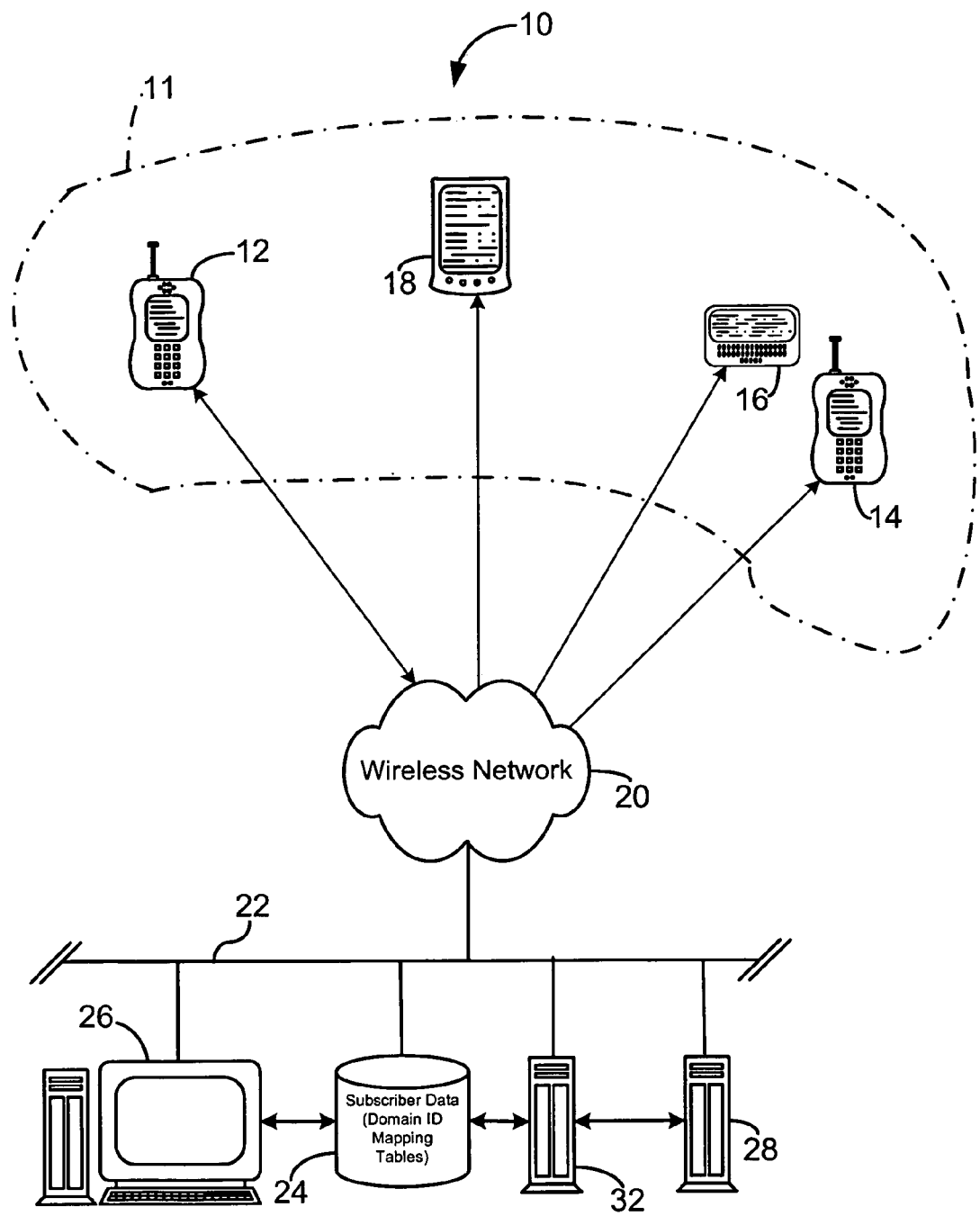
FIG. 1 is a representative diagram of an exemplary embodiment of a wireless telecommunication network with a wireless telecommunication device communicating with a group of other wireless telecommunication devices across the wireless network.

With reference to the figures in which like numerals represent like elements throughout, FIG. 1 illustrates an exemplary embodiment of a wireless telecommunication system 10 for that allows communication channels between one or more wireless telecommunication devices, such as the wireless telephones 12, 14 smart pager 16, and personal digital assistant (PDA) 18, with other wireless telecommunication devices across a wireless network 20. A first group communication server 26 provides one or more communication channels to one or more mobile communication devices, such as devices 12, 14, 16, 18, and at least one mobile communication device, such as cellular telephone 12 selectively communications at least data over one or more communication channels provided by the first communication server 26. At least one data server 28 communicates data with the wireless telecommunication devices 12, 14, 16, 18, and a converter server 32 converts voice data to data transmittable over one or more communication channels, and the converter server 32 sending the converted voice data to the first communication server 26 for transmission across at least one communication channel to the at least one mobile communication device, such as cellular telephone 14. The wireless telecommunication devices 12, 14, 16, 18 are also shown here in a push-to-talk (PTT) group 11 wherein direct communication can be had between the group member devices.

As shown in FIG. 1, cellular telephone 12 sends voice data, in typically in frames or packets, to the wireless network 20, typically to the first communication server 26, which is present on a server-side LAN 22 across the wireless network. The first communication server 26 relays the data to the converter server 32. In other embodiments, further described herein, other computer devices can be resident on the server-side LAN 22 or be accessible across the wireless network 20 to the wireless devices. The first communication server 26 can have an attached or accessible database, such as subscriber data 24 that stores the identification data of subscribers for the wireless devices whereby the communications for various subscribers can be known by the system 10, i.e. which mobile devices 12, 14, 16, 18 can communication in which format. Database 24 can also hold the look-up table 92 (FIG. 4) for the wireless devices to convert the MIN/MDN to SIP URLs as is further described below. It should be appreciated that the number of computer components resident on server-side LAN 22, or across the wireless network 20, or Internet generally, are not limited.

In one embodiment, the mobile device 12, 14, 16, 18 can receive both voice data and data communication over the wireless telecommunication network 20. And as necessary for bandwidth, the system 10 can establish a second communication channel between the first communication server 26 and a mobile device 12, 14, 16, 18, where the second communication can also support both voice and data packets interleaved, as is specified in the CDMA 2000 standard. Further, as shown herein the converter server 32 preferably converts the voice data into internet protocol (IP) data packets, but can alternately use any data frame format where voice data and other computer readable data can be simultaneously encoded. Thus, in the embodiment of FIG. 1, the converter server 32 receives both voice data from mobile devices, such as cellular telephone 12, and converts the received voice data into voice packet data in an IP protocol, and can do the opposite transformation to return IP packet data to voice analog data, or voice data in the appropriate frames, and send the voice data to the communication server 26. And if the mobile communication device 12, 14, 16, 18 is so embodied, the device can convert the transmitted data packets into voice data, and in such embodiment, the communication server 26 need only relay IP packet data to the mobile device 12, 14, 16, 18 and the converter server 32 is unnecessary as the conversion to voice data occurs at the mobile device 12, 14, 16, 18.

Figure 2:
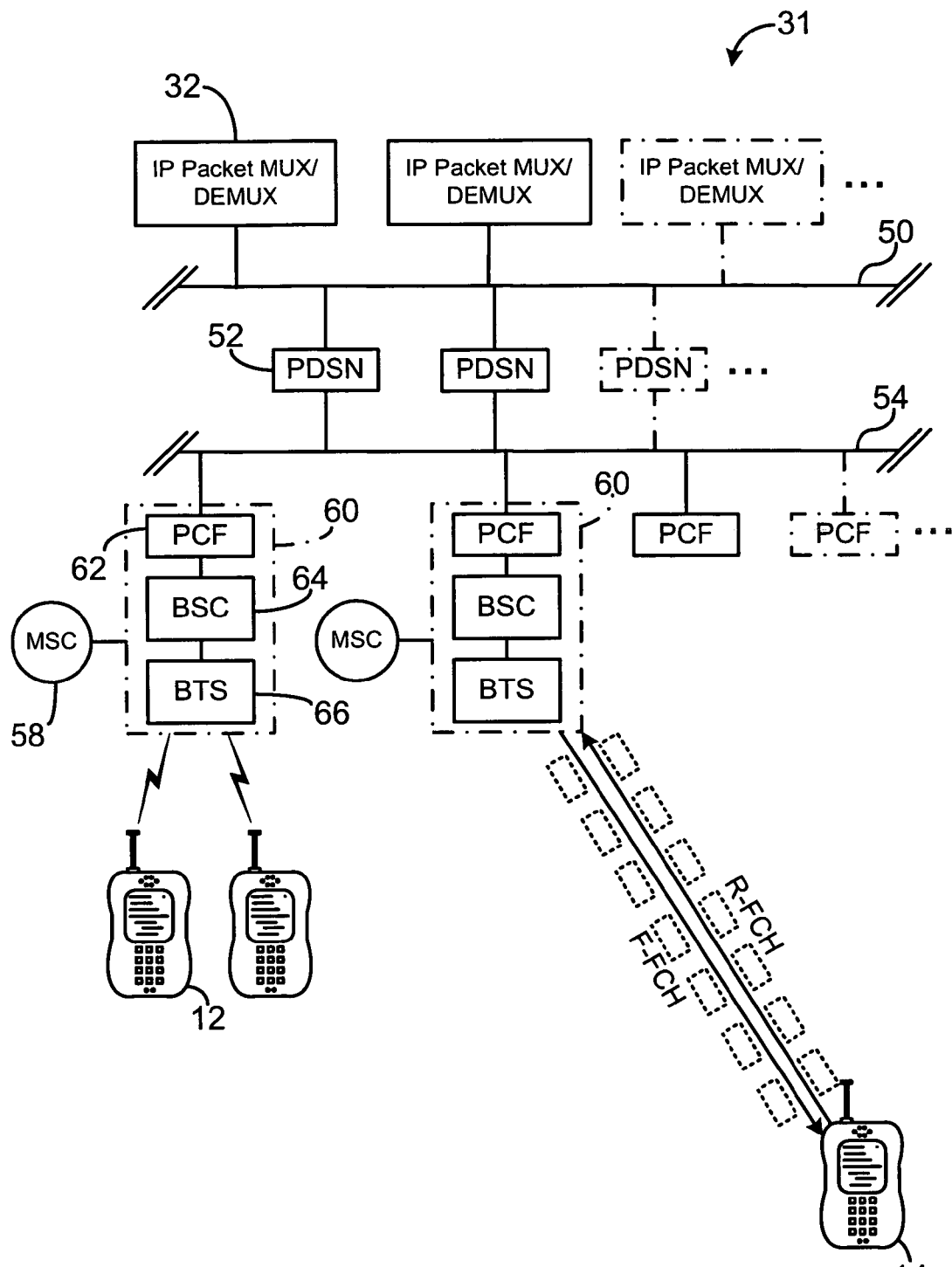
FIG. 2 is a representative diagram of one embodiment of a wireless telecommunication network in a common CDMA cellular telecommunication configuration with an IP Packet facility in communications between the wireless telecommunication devices that use voice analog and/or IP packet data communications.

FIG. 2 is a representative diagram of one embodiment of a wireless network in a common CDMA cellular telecommunication configuration 31, having an array of converter servers 32 to provide the ability for mobile devices 12, 14, 16, 18 to communicate to each other using a data packet protocol, such as an IP protocol, for unified voice and data transmission over a single Walsh pair channel. The wireless network is merely exemplary and can include any system whereby remote modules communicate over-the-air between and among each other and/or between and among components of a wireless network 20, including, without limitation, wireless network carriers and/or servers. A series of converter servers 32 are connected to a group communication server LAN 50. Each converter server 32 is shown here as an IP protocol multiplex(MUX)/demultiplex (DEMUX) such that the converter server 32 can convert the voice data to and from IP packet data for the various mobile devices. Wireless telephones and telecommunication devices 12, 14, 16, 18 can request packet data sessions from the converter server(s) 32 using a data service option.

The converter server(s) 32 are connected to a wireless service provider's packet data service node (PDSN) such as PSDN 52, shown here resident on a carrier network 54. Each PDSN 52 can interface with a base station controller 64 of a base station 60 through a packet control function (PCF) 62. The PCF 62 is typically located in the base station 60. The carrier network 54 controls messages (generally in the form of data packets) sent to a messaging service controller ("MSC") 58. The carrier network 30 communicates with the MSC 32 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the branch-to-source (BTS) 66 by both the network and/or Internet for data transfer and POTS for voice information. The BTS 66 ultimately broadcasts and receives messages wirelessly to and from the wireless devices, such as mobile devices 12, 14, 16, 18, by short messaging service ("SMS"), or other over-the-air methods known in the art.

Cellular telephones and telecommunication devices, such as wireless telephone 14, are being manufactured with increased computing capabilities and are becoming tantamount to personal computers and hand-held PDAs, and accordingly communicate as much computer data as voice data. These "smart" cellular telephones allow software developers to create software applications that are downloadable and executable on the processor of the wireless device. The wireless device, such as cellular telephone 14, can download and send many types of applications, such as web pages, applets, MIDlets, games and stock monitors, or simply data such as news and sports-related data. In direct communications, the mobile device, such as cellular telephone 12, will transmit its voice and/or computer data to the wireless network, an the devices of the wireless network will occur through, or at the control of, the group communication server 32. All data packets of the devices do not necessarily have to travel through the group communication server 32 itself, but the server 32 must be able to ultimately control the communication because it will typically be the only server-side 30 component that is aware of and/or can retrieve the identity of the members of the set 12, or direct the identity of the members of the set 12 to another computer device, such as mapping server 36.

As further shown in FIG. 2, the cellular telephone 14 uses a communication channel with the base station 60 and establishes a forward fundamental channel (F-FCH) and a reverse fundamental channel (R-FCH), each fundamental channel using a Walsh code for communication and hence the establishing of the dedicated channel requiring a pair of Walsh codes. For voice data, the data is typical encapsulated in data frames and handled by the PCF 60. In this embodiment, the converter server 32 will receive the stream of standard voice packets from the PDSN 52 and convert the voice packets into data packets, preferably in IP Protocol, such as a common Voice-over-IP Protocol as known in the art.

In telecommunications, a "frame" is data transmitted between network points as unit with addressing and the requisite protocol control information. The information or data in the frame may contain another encapsulated frame that is used in a higher-level or different protocol. Actually, in many instances, a frame constructed for data relay typically carries data that has been framed by an earlier protocol program. Thus, for example, voice packets used in the CDMA communication protocol will typically be in a frame or packet of a first transmission protocol, and the converter server 32 can either encapsulate the voice packet frame of the first transmission protocol within an IP protocol frame (second transmission protocol) for relay, or can completely convert the voice data into IP protocol data. If so embodied, the converter server 32 likewise can remove, extract, or convert the voice data from the IP protocol frame and relay the voice data, typically in common voice packet relay form, to the communication server 26 for relay to the mobile device 12, 14, 16, 18.

Figures 3, 4:
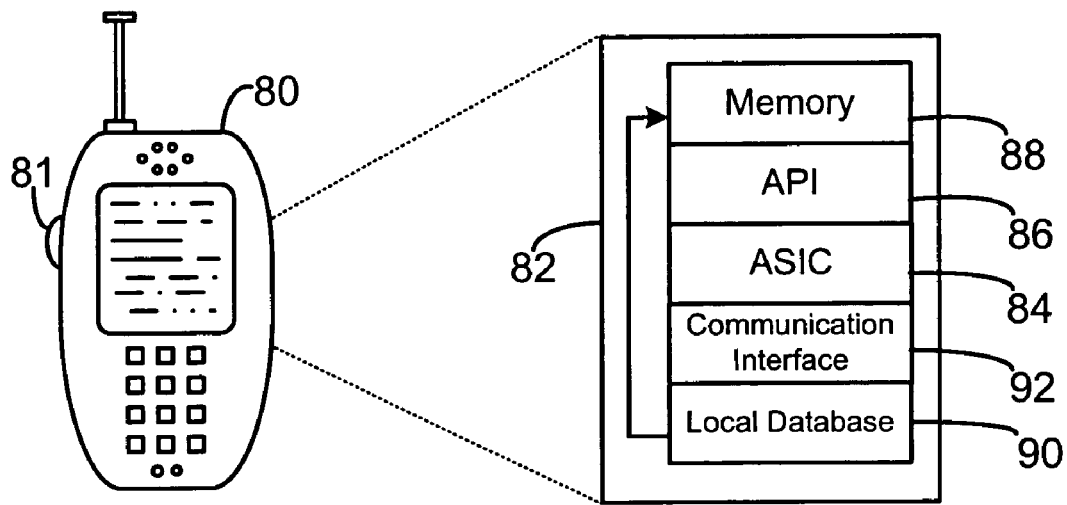
FIG. 3 is a block diagram illustrating the computer platform of the wireless telecommunication device in an exemplary embodiment.
FIG. 4 is an exemplary embodiment of a look-up table resident on the wireless telecommunication device to append domain IDs to MINs of communicating wireless telecommunication devices to create SIP URLs for the communicating devices.

FIG. 3 is a block diagram illustrating the computer platform 82 of the wireless device (cellular telephone 80) with a communication interface 92. The wireless device 81 includes a PTT button 81 to engage in PTT communications. The computer platform 82 can handle voice and data packets, and receive and execute software applications transmitted across the wireless network 20. The computer platform 80 includes, among other components, an application-specific integrated circuit ("ASIC") 84, or other processor, microprocessor, logic circuit, programmable gate array, or other data processing device. The ASIC 84 is installed at the time of manufacture of the wireless device and is not normally upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW) software developed by Qualcomm® for wireless device platforms.

As shown here, the wireless device can be a cellular telephone 81 but can also be any wireless device with a computer platform as known in the art, such as a personal digital assistant (PDA), a pager with a graphics display, or even a separate computer platform that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk.

The preceding background and the forgoing description is in terms of a CDMA infra-structure, a push to talk system, and the use of a MIN/MDN parameter to translate to a domain name. It should be recognized by those skilled in the art that the scope of the invention includes network topologies other than CDMA, and data communication systems, including voice over IP systems, that allow applications to transmit data to another device, and addressing parameters that can be used in translating a domain name other than MIN/MDN.

In the wireless telecommunication device 81, the communication interface 92 selectively interfacing and sending and receiving data across the wireless telecommunication network 20, and the wireless telecommunication device 12, 14, 16, 18 further receives a first wireless device identifier in a first network protocol to identify a specific other device on the wireless telecommunication network 14, such as a MIN/MDN from a communicating wireless telecommunication device 12, 14, 16, 18. The wireless telecommunication device 81 further includes a converter or other software program in the memory 88 or local database 90 to generate a second wireless device identifier for the specific other device in a second network protocol, such as a SIP URL, so that communications can be made in the second network protocol. The converter is capable of making a plurality of second wireless device identifiers based upon the first wireless device identifier, such as shown in the domain mapping table 92 of FIG. 4.

FIG. 4 is an exemplary embodiment of a look-up table 92 resident on the wireless telecommunication device to append domain IDs to MINs of communicating wireless telecommunication devices to create SIP URLs for the communicating devices. A MIN-Domain Mapping Table 92 can be defined on the client devices using this SIP URL addressing based data application. These sessions include Internet multimedia conferences, Internet telephone calls and multimedia distribution. Members in a session can communicate via multicast or via a mesh of unicast relations, or a combination of these. An example of a SIP URL address is "someone@10.1.2.3"

When a user of the wireless telecommunication device 12, 14, 16, 18 types in the MIN/MDN for another device, a domain is appended onto the phone number based on a part of the number that may be specified a particular region or area (such as a prefix to, or a portion of the phone number) as per pre-defined mapping. For example, for numbers in the United-States, the area-code may be used in the min-domain mapping table 92, e.g. area codes 858, 619 map to regionSD.carrier.com; area codes 848, 732 map to regionNJ.carrier.com, as shown in the table 92.

In a PTT embodiment, the system 10 uses an address in the form of a SIP URL to identify each device or predefined group. Every user is assigned a single unique user address per group wireless telecommunication device they own. Every predefined group is assigned a single unique group address. These addresses may be exposed to the receiving wireless telecommunication device and can be exchanged between wireless devices when sharing contact information.

Figure 5:
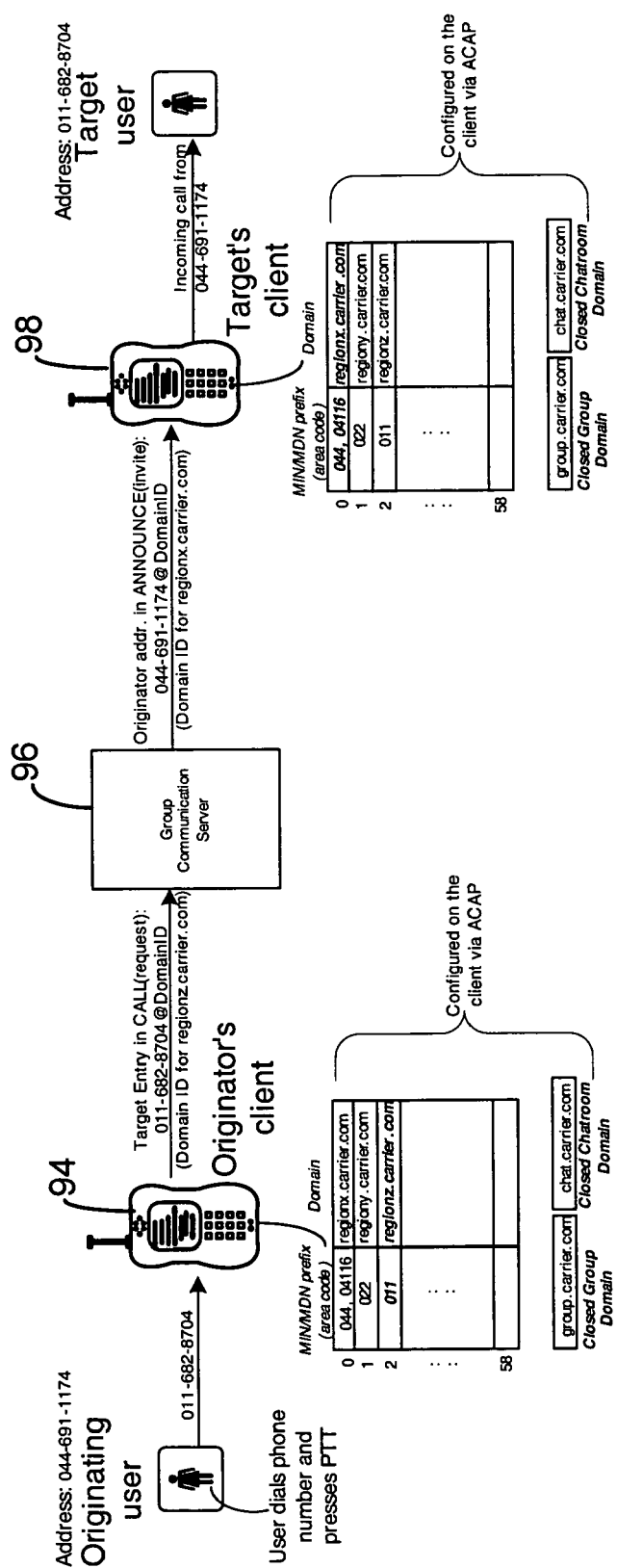
FIG. 5 is a diagram illustrative of one embodiment of a telecommunication between an originating and target wireless telecommunication device using the SIP URLs created on the wireless telecommunication devices.

FIG. 5 is a diagram illustrative of one embodiment of a telecommunication between and originating wireless device 94 and target wireless telecommunication 98 device through a group communication server 96 using the SIP URLs created on the wireless telecommunication devices. In such system 10, when a user subscribes for a PTT service, the PTT client application is downloaded to the device. During initial subscription, a user address is assigned to the PTT client device. For intra-carrier calls, the group devices may contact each other using MIN/MDN numbers and not by typing the entire SIP URL. The users may simply type in (or select) a MIN/MDN number for direct calls or a combination of MIN/MDN numbers for ad-hoc group calls and press the PTT button 81 in order to initiate a PTT call to the target wireless device 98.

Thus, in one process of use, a user of the originating device 94 manually enters the MIN/MDN number of the target deice 98 and presses the PTT button to initiate a PTT call. The user then stores the contact entry for another user in the contact list by storing the MIN/MDN under the device name of that user, and when a user receives an incoming call from another user, the MIN/MDN of the caller is displayed. The wireless device then place (automatically if so desired) the incoming MIN/MDN into a list of contact entries and store the contact entry for an ad-hoc group defined at the wireless device 81 with the MIN/MDN for the members in that group under the name of the ad-hoc group.

In one embodiment, a default domain is configured at the wireless telecommunication device 12, 14, 16, 18 throughout the PTT system. When a user types in the MIN/MDN for an outgoing communication, the default domain is appended onto the number. For pre-defined group and chat-room addresses, another default domain may be used with the string "group" and "chat" as a part of the domain name respectively. Thus, the SIP URL for user addresses in the client request sent to the group communication server 96 is of the following form: <phone-number>@<default-domain>. This approach requires minimal changes on the wireless device, i.e., a default domain that is pre-configured on each client.

In another embodiment with a MIN Domain Mapping Table, such as that shown in FIGS. 4 and 5, is configured on the wireless devices throughout the system. When the originating wireless device 94 types in the MIN/MDN for a target wireless device 98, a domain is appended onto the MIN/MDN numbers based on a part of the number that may be specifying a particular region or area (such as a area code prefix to or a portion of the phone number) as per the mapping table 92. The MIN-Domain Mapping Table 92 is a carrier-configurable parameter, used when the carrier would like to allow its subscribers to type in MIN/MDN numbers to contact each other. The MIN-Domain Mapping Table 92 can define multiple prefixes being mapped to a single domain.

Thus, when a user of the originating wireless device 94 types in a MIN/MDN to make a call, the originating wireless device 94 detects the portion of the phone number used for looking up the domain in the MIN-Domain Mapping Table 92. Then the device looks up the Domain ID for the domain in the Domain ID Mapping Table 92, and appends the Domain ID to the phone-number in order to generate the target wireless device in the SIP URL address sent in the CALL request message to the group communication server 96.

Figure 6:
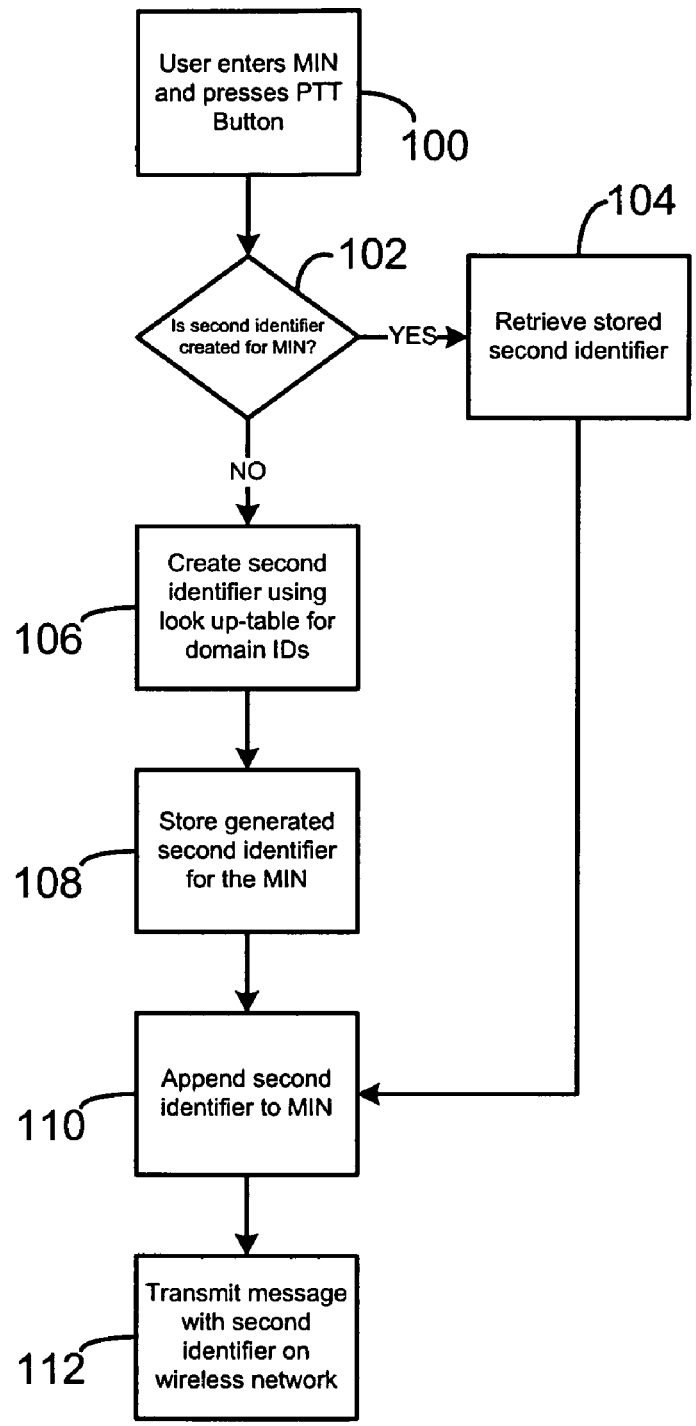
FIG. 6 is a flowchart of an exemplary embodiment of a process executing on the wireless telecommunication device to appended domain IDs to MIN for other communicating wireless telecommunication devices in a push-to-talk (PTT) system.

FIG. 6 is a flowchart of an exemplary embodiment of a process executing on the wireless telecommunication device 12 to appended domain IDs to MIN for other communicating wireless telecommunication devices in a push-to-talk (PTT) system, such as PTT group 11. A user enters the MIN of a communicating device (wireless telecommunication device 80 in FIG. 3) and presses the PTT button (PTT button 81). A determination is then made as to whether the second identifier has been created for the MIN desired to be contacted, as shown at decision 102. If present in the local database 90 of the device 80, the MIN was most likely created from a prior communication received from the communicating wireless device from the PTT group 11. Thus, if the second identifier is present at decision 102, then the process retrieves the stored second identifier as shown at step 104 and the process forwards to step 110 and appends the second identifier to the outgoing communication, If there is not a second identifier at decision 102, then a second identifier is created using the look up table 92 (FIG. 4), as shown at step 106, and then the generated second identifier is stored for the MIN, as shown at step 108. Then the second identifier is appended to the MIN, as shown at step 110, which also is arrived at after a stored second identifier is retrieved at step 104. Finally, the PTT message is transmitted with the second identifier appended as shown at step 112. The PTT message can be text, VoIP, a program, or any other communication that would use a SIP URL address for messaging purposes.

It can thus be seen that the system 10 provides a method of generating a second network identifier of a second network protocol, such as a SIP URL, at a wireless telecommunication device 12, 14, 16, 18 having a first network identifier in a first network protocol for other wireless telecommunication devices on the wireless telecommunication network 20, through the steps of selectively interfacing a wireless telecommunication network 20 from the wireless telecommunication device 12, 14, 16, 18, then receiving a first network identifier from a communicating wireless telecommunication device (such as originating device 94), and generating a second network identifier at the wireless telecommunication device 12, 14, 16, 18 in a second network protocol for the communicating wireless telecommunication device, the wireless telecommunication device capable of generating a plurality of second network identifiers based upon the first network identifier, such as from a Domain ID Mapping Table 92 in FIGS. 4 and 5.

In one embodiment, the second network protocol can be TCP/IP, and the second wireless device identifier can be a session initiation protocol universal resource locator (SIP URL), and the step of generating a second network identifier is then generating a SIP URL. And if the first network protocol is telephony protocol, and the first wireless device identifier is a telephone number, the step of generating a second network identifier is appending a domain to the telephone number. Where the first wireless device identifier is a mobile identification number (MIN), the step of generating a second network identifier is appending a domain to the MIN, as is shown in FIGS. 4 and 5.

In another embodiment, the step of generating a second network identifier includes generating a second network identifier including information on the geographic location of the communicating wireless telecommunication device, such as using a domain ID for a specific geographic region of the wireless telecommunication device 12, 14, 16, 18. The method can further include the step of generating a plurality of second network identifiers for the communicating wireless telecommunication device based upon the first wireless device identifier, such as making more than one possible SIP URL. In one exemplary embodiment, the step of generating a second network identifier occurs from using a look-up table 92 (FIG. 4) to convert the first network identifier into a second network identifier.

While there has been shown a preferred and alternate embodiment of the present invention, it is to be understood that certain changes may be made in the form and arrangement of the elements of the present invention without departing from the underlying spirit and scope of the invention as set forth in the Claims appended hereto. Furthermore, although elements of the invention may be described or claimed in the singular, the plural is contemplated unless limitation to the singular is explicitly stated. Also, as used herein, the term "exemplary" is meant to be only illustrative, and is not intended to mean "preferred" or otherwise indicate any degree of preference.

What is claimed is:

1. A wireless telecommunication device, comprising a computer platform having at least a memory and a communication interface,
    the wireless telecommunication device further selectively interfacing and sending and receiving data across a wireless telecommunication network through the communication interface,
    the wireless telecommunication device further receiving a first wireless device identifier in a first network protocol for a communicating wireless telecommunication device on the wireless telecommunication network, and
    the wireless telecommunication device further including a converter in the memory to generate a second wireless device identifier in a second network protocol that includes information on a geographic of the communicating wireless telecommunication device in a second network protocol, the converter configured to make a plurality of second wireless device identifiers based upon the first wireless device identifier, the plurality of second wireless device identifiers including a group communication identifier.

2. The wireless telecommunication device of claim 1, wherein the first network protocol is telephony protocol, and the first wireless device identifier is a telephone number.

3. The wireless telecommunication device of claim 1, wherein the first wireless device identifier is a mobile identification number (MIN).

4. The wireless telecommunication device of claim 3, wherein the converter maps the MIN to a domain ID under TCP/IP.

5. The wireless telecommunication device of claim 1, wherein the second network protocol is TCP/IP, and the second wireless device identifier is a session initiation protocol universal resource locator (SIP URL).

6. The wireless telecommunication device of claim 1, wherein the converter is a look-up table to convert the first wireless device identifier into the second wireless device identifier.

7. A wireless telecommunication means for sending and receiving data across a wireless telecommunication network, the wireless telecommunication means further receiving a first identifier in a first network protocol for a communicating wireless telecommunication device on the wireless telecommunication network, the wireless telecommunication means comprising:
    a memory means for storing data;
    a communication means for selectively sending and receiving data across the wireless telecommunication network; and
    a converter means for generating, at a communication wireless telecommunication device, from the first identifier a second identifier in a second network protocol that includes information on a geographic location of the communicating wireless telecommunication device in a second network protocol, the converter means further configured to make a plurality of second identifiers based upon the first identifier, the plurality of second identifiers including a group communication identifier.

8. A method of generating a second network identifier of a second network protocol at a wireless telecommunication device having a first network identifier in a first network protocol for other wireless telecommunication devices on a wireless telecommunication network, comprising:
    selectively interfacing the wireless telecommunication network from the wireless telecommunication device;
    receiving the first network identifier for a communicating wireless telecommunication device; and
    generating the second network identifier at the wireless telecommunication device in the second network protocol that includes information on a geographic of the communicating wireless telecommunication device, the wireless telecommunication device configured to generate a plurality of second network identifiers based upon the first network identifier, the plurality of second network identifiers including a group communication identifier.

9. The method of claim 8, wherein the second network protocol is TCP/IP, and the second network identifier is a session initiation protocol universal resource locator (SIP URL), and generating the second network identifier is generating the SIP URL.

10. The method of claim 9, wherein the first network protocol is telephony protocol, and the first network identifier is a telephone number, and generating the second network identifier is appending a domain to the telephone number.

11. The method of claim 8, wherein the first network identifier is a mobile identification number (MIN), and generating the second network identifier is appending a domain to the MIN.

12. The method of claim 8, wherein generating the second network identifier occurs from using a look-up table to convert the first network identifier into the second network identifier.

13. A method of generating a second network identifier of a second network protocol at a wireless telecommunication device receiving a first network identifier in a first network protocol for a communicating wireless telecommunication device, the wireless telecommunication device capable of generating a plurality of second network identifiers based upon the first network identifier, the method comprising:
    selectively interfacing a wireless telecommunication network from the wireless telecommunication device; and
    generating the second network identifier at the wireless telecommunication device in the second network protocol that includes information on a geographic location of the communicating wireless telecommunication device, the wireless telecommunication device configured to generate the plurality of second network identifiers based upon the first network identifier, the plurality of second network identifiers including a group communication identifier.

14. A non-transitory computer-readable medium on which is stored instructions that when executed by a wireless telecommunication computer device, generates a second network identifier of a second network protocol from a first network identifier in a first network protocol for a communicating wireless telecommunication device, through causing the executing wireless telecommunication device to perform:
- selectively interfacing a wireless telecommunication network from the wireless telecommunication device;
- receiving the first network identifier for the communicating wireless telecommunication device; and
- generating the second network identifier at the executing wireless telecommunication device in the second network protocol that includes information on a geographic location of the communicating wireless telecommunication device, the wireless telecommunication device configured to generate a plurality of second network identifiers based upon the first network identifier, the plurality of second network identifiers including a group communication identifier.

15. The non-transitory computer-readable medium of claim 14, wherein the second network protocol is TCP/IP, and the second network identifier is a session initiation protocol universal resource locator (SIP URL), and at least on instruction causes generating the second network identifier to be generating the SIP URL.

16. The non-transitory computer-readable medium of claim 15, wherein the first network protocol is telephony protocol, and the first network identifier is a telephone number, and at least one instruction causes generating the second network identifier to be appending a domain to the telephone number.

17. The non-transitory computer-readable medium of claim 14, wherein the first wireless device identifier is a mobile identification number (MIN), and at least one instruction causes generating the second network identifier to be appending a domain to the MIN.

18. The non-transitory computer-readable medium of claim 14, wherein at least one instruction causes generating the second network identifier to be using a look-up table to convert the first network identifier into the second network identifier.

* * * * *